Nov. 30, 1926.

I. MARGOLIUS

COTTON BALE COVER

Filed Jan. 21, 1926   2 Sheets-Sheet 1

1,609,030

WITNESSES
H. A. LaClair

INVENTOR
Isidor Margolius
BY
ATTORNEYS

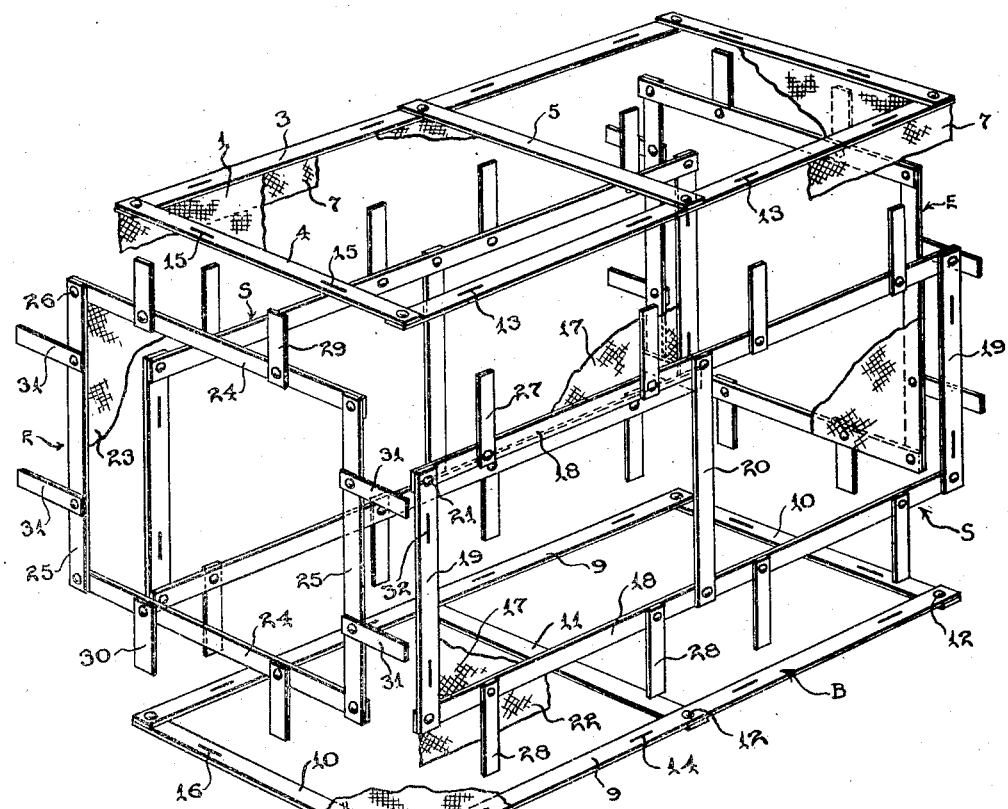

Patented Nov. 30, 1926.

1,609,030

UNITED STATES PATENT OFFICE.

ISIDOR MARGOLIUS, OF NORFOLK, VIRGINIA.

COTTON-BALE COVER.

Application filed January 21, 1926. Serial No. 82,799.

My invention relates to improvements in cotton bale covers, and it consists in the combinations, constructions and arrangements herein described and claimed.

An object of the invention is the provision of a cotton bale cover which affords facilities for confining cotton therewithin more firmly and uniformly than is possible with any prior cotton bale cover of which I am aware.

A further object of the invention is the provision of a cotton bale cover which is extremely strong and durable and which will have a relatively great efficiency as a means for holding the bale of cotton in shape under stress.

A further object of the invention is to effect an economy in the quantity of fabric which will be required to cover a cotton bale of a given size.

A still further object of the invention is the provision of a cotton bale cover which can be quickly and easily applied to a cotton bale and which is not likely to be displaced from applied position.

Other objects and advantages of the invention will be apparent from the following description, considered in conjunction with the accompanying drawings, in which—

Figure 3 is a perspective view of the sections of the cotton bale cover separated from one another, portions of the fabric sheets of the sections being broken away to reveal parts which would otherwise be hidden, and Figure 4 is a vertical section substantially on the line 4—4 of Figure 1.

Figure 1:
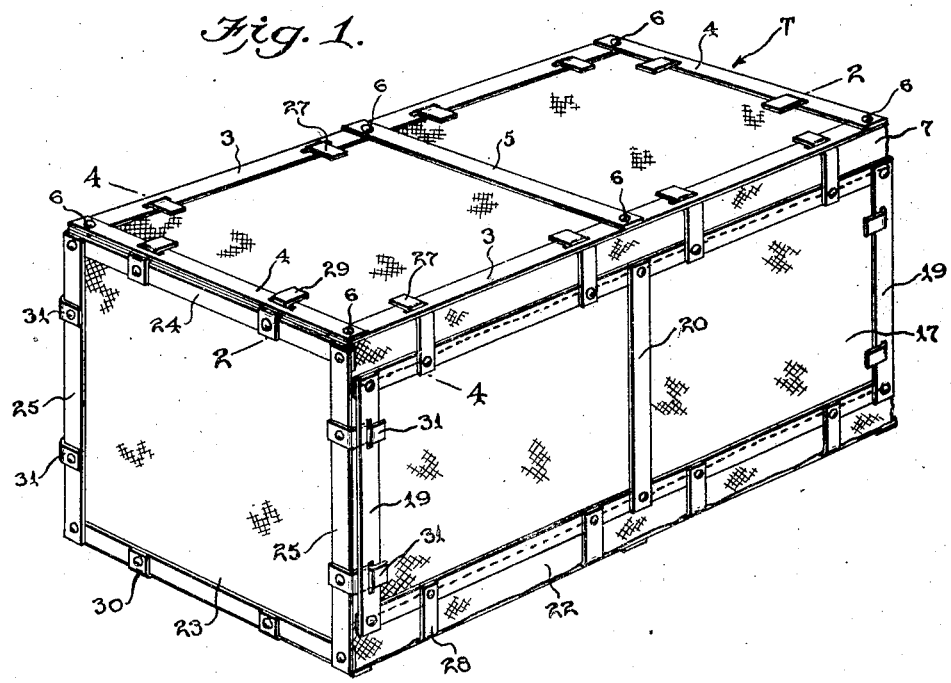
Figure 1 is a perspective view of the improved cotton bale cover applied.
Figure 2:
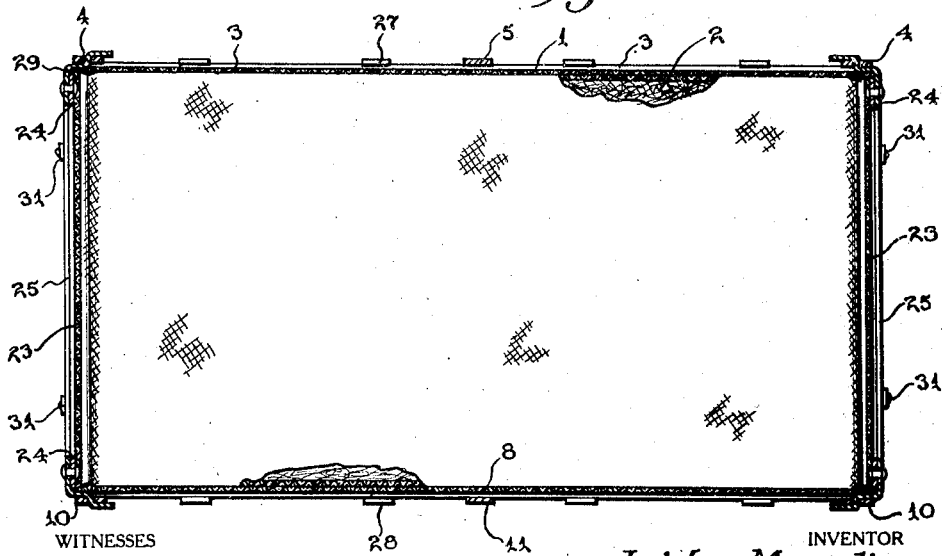
Figure 2 is a horizontal section substantially along the line 2—2 of Figure 1.

The improved cover comprises a top section generally indicated at T, a bottom section generally designated B, a pair of side sections each generally indicated at S, and a pair of end sections, each designated E. The top section T comprises a rectangular sheet of fabric, such as burlap, indicated at 1, having a length approximately the same as that of a bale of cotton 2 with which the cover is to be used and having a width greater than the width of the cotton bale. The top section T also comprises a frame which is formed of the side bars 3, the end cross bars 4 and the middle cross bar 5, the ends of the cross bars being superimposed on the side bars 3 and being secured to the latter by rivets 6 or like fastening devices which also serve to secure the underlying sheet of fabric 1 to the associated frame. The cross bars have a length approximately equal to the width of the associated cotton bale and the side bars 3 have a length approximately equal to that of the associated cotton bale. The connections of the end cross bars 4 with the side bars 3 are at the ends of the side bars 3 and the frame of the top section T is disposed on the sheet of fabric 1, so that the end cross bars 4 extend along end edges of the sheet 1 and the side bars 3 are located equal distances from the adjacent side edges of the sheet 1, whereby the side edge portions of the fabric 1 will extend beyond the side edges of the associated frame and constitute flaps as indicated at 7. The bottom section B comprises a rectangular sheet of fabric 8 which differs from the sheet of fabric 1 of the top section only in that it is of less width than the sheet 1 and of approximately the same width as the associated bale 2. The bottom section B also includes a stiffening and bracing frame which is formed of the side bars 9, the end cross bars 10, and the middle cross bar 11, the ends of the cross bars being secured to the side bars by rivets 12 which also serve to secure the sheet of fabric 8 to the associated frame of the bottom section. The end edges of the sheet of fabric 8 therefore terminate substantially flush with the ends of the associated frame and the side edges of the sheet of fabric 8 also terminate substantially flush with the side edges of the associated frame.

Each side bar 3 of the frame of the top section T has a plurality of regularly spaced longitudinally extending slits or elongated openings 13 formed therein and the side bars 9 of the frame of the bottom section B have similar and correspondingly spaced slits 14 formed therein. The cover illustrated in the drawings has four slits 13 in each side bar of the frame of the top section and a like number of slits 14 in each side bar of the frame of the bottom section. Each end cross bar 4 of the frame of the top section is shown as having two spaced slits 15 formed therein and each end cross bar 10 of the frame of the lower section has a like number of similarly spaced slits formed therein, as indicated at 16. Each side section S comprises a rectangular sheet of fabric 17 having a length approximately equal to that of the associated bale 2 and having a width as much less as the height of the associated bale 2 as the width of each flap 7 of the top section. The stiffening and bracing frame of each side section comprises a pair of longitudinal bars 18 having a length approximately equal to that of the associated bale 2 and a pair of end transverse bars 19 and a middle transverse bar 20, the transverse bars having a length somewhat less than the width of the associated sheet of fabric 17. The ends of the transverse bars 19 and 20 are secured to the longitudinal bars 18 by rivets 21 which also serve to secure the sheet of fabric 17 to the associated frame, the arrangement being such that the upper edge of the sheet of fabric 17 is substantially flush with the upper side of the associated frame while the lower edge portion of the sheet of fabric depends below the lower side of the associated frame and constitutes a flap, as indicated at 22. Each end section E comprises a rectangular sheet of fabric 23 and a stiffening and bracing frame comprising the upper and lower horizontal bars 24 and the vertical end bars 25, the ends of the vertical bars 25 being secured to the end portions of the horizontal bars 24 by rivets 26 which also serve to secure the sheet of fabric 23 to the associated frame. The marginal edges of the sheet of fabric 23 terminate substantially flush with the corresponding edges of the associated frame and the sheet of fabric 23 has a length approximately equal to that of an end of the bale 2 and a height approximately equal to the height of the end of the bale 2.

The upper side bar 18 of the frame of each side section carries straps 27 which correspond in number and relative arrangement with the slits 13 in the adjacent side bar of the frame of the top section, each strap 27 being adapted to be projected through the corresponding slit 13. The lower side bar 18 of each side section carries depending straps 28 adapted to be projected through the corresponding slits 14 in the adjacent side bar 9 of the bottom section B. The upper horizontal bar 24 of each end section carries upwardly extending straps 29 suitably spaced on the supporting bar 24 for engagement with the slits 15 of the adjacent end cross bar of the frame of the top section T. The lower horizontal bar 24 of each end section carries depending straps 30 in position to be projected through corresponding slits 16 in the adjacent end cross bar of the frame of the bottom section B. In addition, the vertically extending spaced straps 31 for engaging with correspondingly spaced vertical slits 32 in the bars 19 of the frames of the side sections. The cover illustrated in the drawings has two of the straps 31 on each vertical bar 25 and a like number of slits 32 in each vertical bar 19.

From the foregoing description of the various parts of the device, the operation thereof may be readily understood. The bottom section B is placed in the bottom of the usual press box, not shown, and the cotton which is to form the bale 2 then is placed on the bottom section B in the press box. The top section T then is placed on the cotton in the press box and the cotton is compressed as desired. The side doors of the press box are opened and the side sections S are arranged in place at opposite sides of the bale and the straps 27 are projected through the corresponding openings or slits 13 and may be bent as shown in Figure 1 to retain the side sections S in place and the top and bottom sections of the cover clamped to the top and bottom of the bale, respectively. The end doors of the press box then are opened and the end sections E are disposed at the ends of the bale and the straps 29, 30 and 31 are projected through the slits 15, 16 and 32, respectively, and are retained in place by bending the ends of the straps 29, 30 and 31 as shown in Figure 1. The arrangement is such that the bale 2 is completely covered by fabric, the flaps 7 of the top section T of the cover being disposed between the portions of the straps 27 which were not projected through the slits 13 during the operation of securing the side sections S and the top section T in place on the bale and the flaps 22 extending between the bale and the portions of the straps 28 which were not projected through the associated slits 14, as clearly shown in Figure 1. The use of excess fabric to cover a bale of a given size completely with fabric therefore will be obviated when my improved cover is used and the fabric covering members of the bale therefore will be completely reinforced and held in place by the frames of the sections of the cover 7. The members of the frames of the sections of the cover preferably are light gauge metallic bars or strips and the fastening straps likewise are metallic members although these fastening straps and the frame members of the sections of the cover may be made of any suitable material or materials, possessing the desired strength and being bendable. The fabric members of the cover sections may be fire-proofed or made of asbestos or any other suitable material, although burlap preferably will be used.

Obviously, my invention is susceptible of embodiment in forms other than that illustrated in the accompanying drawings, and I therefore consider as my own all such modifications and adaptations of the form of the device herein described as fairly fall within the scope of the appended claims.

I claim:—

1. A cover for cotton bales comprising a plurality of sections, each of said sections comprising a sheet of fabric and a frame of relatively stiff material secured to said fabric, certain of said sections having fastening straps extending outwardly from the frames thereof and the other sections having openings in the members of the frames thereof for engagement with the fastening straps of the adjacent sections, marginal edge portions of the fabric members of certain of the sections extending beyond the associated frames and constituting flaps adapted to extend between the bale and the fastening means between the adjacent sections.

2. A cover for cotton bales comprising a top section, a bottom section, a pair of side sections, and a pair of end sections, each of said sections comprising a sheet of fabric and a substantially rectangular metallic frame secured to the fabric, adjacent sections having cooperative fastening means at adjacent edges of the frames thereof for connecting said adjacent sections, the vertical distance between the horizontal members of the frame of each of the side sections being less than the normal height of the bale and the fabric member of said top section having side flaps adapted to extend at the sides of the bale from the side edges of the frame of the top section to the upper horizontal members of the frames of said side sections.

3. A cover for cotton bales comprising a top section, a bottom section, a pair of side sections, and a pair of end sections, each of said sections comprising a sheet of fabric and a substantially rectangular metallic frame secured to the fabric, adjacent sections having cooperative fastening means at adjacent edges of the frames thereof for connecting said adjacent sections, the vertical distance between the horizontal members of the frame of each of the side sections being of less than the normal height of the bale and the fabric member of said top section having side flaps adapted to extend at the sides of the bale from the side edges of the frame of the top section to the upper horizontal members of the frames of said side sections, the fabric members of the side sections having marginal flaps at their lower edges extending from the lower horizontal members of the frames of the side sections to the bottom of the associated bale.

ISIDOR MARGOLIUS.